May 11, 1965 T. A. PICKERING 3,183,364

ELECTRONIC SINGLE POLE-DOUBLE THROW SWITCH

Filed May 29, 1959

INVENTOR.
T.A. PICKERING

BY Warren H. Whitesel
ATTORNEY

United States Patent Office 3,183,364
Patented May 11, 1965

3,183,364

ELECTRONIC SINGLE POLE-DOUBLE THROW SWITCH

Thomas A. Pickering, Chicago, Ill., assignor to International Telephone and Telegraph Corporation, New York, N.Y., a corporation of Maryland Filed May 29, 1959, Ser. No. 816,869
2 Claims. (Cl. 307—88.5)

Figure 2:
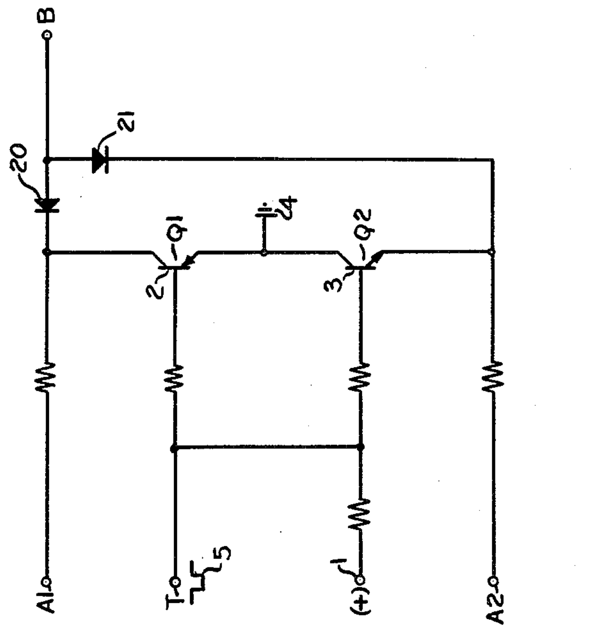

This invention relates to electronic logic circuits and more particularly to single pole-double throw circuit for selectively switching signals.

In the field of logic circuitry, it is frequently necessary to switch voltages appearing on certain terminals to a selected one of several terminals under the influence of control signals. In the past, one manner in which this function has been accomplished was by means of an electromagnetic relay having contacts of single pole, double throw configuration wherein input signals applied to normally closed contacts pass through the relay contact assembly and appear at an output terminal. However, if the relay is energized when input signals are applied, output signals appear at a third terminal. Furthermore, these same functions may be performed electronically by means of two interconnected logic circuits known as a two-input AND circuit and an inhibit circuit. If input signals are applied simultaneously to one of the two input terminals of the AND circuit and to a conducting input terminal of the inhibit circuit, the signals will normally appear at the output terminal of the inhibit circuit. When the other input of the AND circuit is energized and the inhibit circuit is blocked simultaneously therewith, it is as if an electromagnetic relay operates so that the original signals appear at the output of the AND gate. By the use of suitable wiring, the output of the inhibitor may be reduced to zero. A principal disadvantage of using the "and-inhibit" gate combination is that a very high output impedance is commonly exhibited thereby.

An object of the invention is to provide new and improved electronic logic circuitry.

Another object of the invention is to provide switching at electronic speeds with low output impedance.

Yet another object of the invention is to provide for selectively switching signals on an input terminal to either of two output terminals depending upon the presence or absence of control signals.

Still another object of the invention is to provide for selectively switching signals on either of two input terminals to an output terminal depending upon the presence or absence of control signals.

In accordance with this invention an electrical network is provided with a plurality of interconnected terminals. Electronic devices are connected between certain of the terminals and a neutral or ground potential. When an electronic device is conductive, the associated terminal is at a ground or neutral potential thereby providing a shunt at that terminal to prevent any signals applied to other terminals from being effective thereat. Since the electronic devices may be selectively rendered conductive and non-conductive, there may be a selection of the terminals which are effective for transmitting signals that are applied to the network.

While the electronic devices may take many forms, an embodiment described hereinafter includes a pair of semiconductors having "complementary symmetry" wherein one device is normally conductive and the other device is normally nonconductive; however, a suitable control may be exercised to reverse the states of conductivity so that the first mentioned device becomes non-conductive and the second device becomes conductive. Therefore, input signals are selectively shunted to ground depending upon the presence or absence of a control potential which is used to switch the conductive state of the two semi-conductors.

Figure 1:
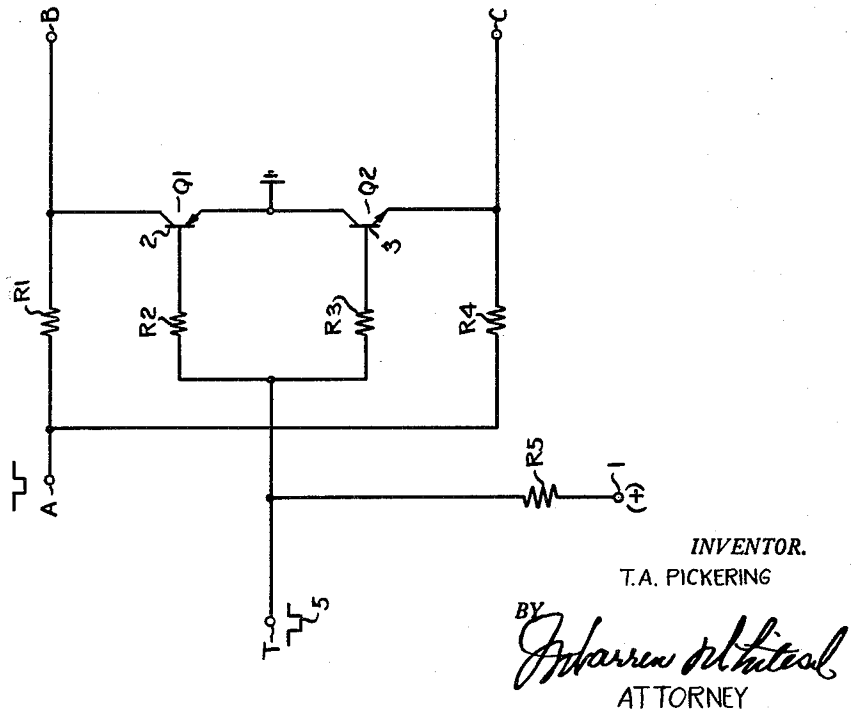

The above mentioned and other objects of this invention together with the manner of obtaining them will become more apparent and the invention itself will be best understood by making reference to the following description of two embodiments of the invention taken in conjunction with the accompanying drawings, in which:

FIG. 1 shows an electronic circuit for switching signals appearing at a single input terminal to either of two output terminals; and FIG. 2 shows an electronic circuit for switching signals appearing at either of two input terminals to an output terminal.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, the drawing shows transistor Q1 as a P–N–P type and transistor Q2 as a N–P–N type; whereas, any two electronic devices may be used if they can be connected to be selectively and oppositely rendered conductive or non-conductive responsive to the same control potential. Moreover, the subject drawings show the control as resulting from a selective application of opposite polarities; whereas, any suitable control potential may be used, for example, a switching circuit may rely upon phase shift, time control, or the like. Quite obviously, other examples could be selected to illustrate the manner in which the terms that have been used and the items which have been described are entitled to a wide range of equivalents.

Both figures show two electronic devices Q1 and Q2 having opposite control characteristics. That is, item Q1 is shown as a P–N–P type transistor and item Q2 is shown as an N–P–N type transistor. Base electrodes 2 and 3 are connected to a common biasing potential of positive polarity which is designated by the reference numeral 1. Therefore, transistor Q2 is normally conductive while transistor Q1 is normally non-conductive when a negative pulse is applied to terminals A and A1 of FIG. 1 and FIG. 2 respectively. If a control potential of opposite polarity (represented graphically by pulse 5) is applied at point T the conductive states of the two transistors is reversed, i.e. transistor Q2 becomes non-conductive and transistor Q1 becomes conductive. These electronic devices may, therefore, be selectively switched "off" and "on" to control the transmission of signalling currents through selected ones of the signal translating terminals which are designated in FIG. 1 by the letters A, B and C and which are designated in FIG. 2 by the reference symbols A1, A2 and B.

Means is provided by the circuitry of FIG. 1 for effectively coupling input terminal A to either output terminal B or output terminal C. Input terminal A is connected to output terminals B and C through resistors R1 and R4 respectively. If transistors Q1 and Q2 were not present, any signal applied to input terminal A would appear on both of the output terminals B and C. However, when transistors Q1 and Q2 are connected as shown in FIG. 1, the input signal on one of the output terminals is shunted to ground via a conductive transistor. For example, when transistor Q2 is conductive, a circuit may be traced from input terminal A through resistor R4, and conductive transistor Q2 to ground 4; hence, input signals applied at terminal A are shunted to ground. Output terminal C is at ground potential; however, the potential drop across resistor R4 tends to isolate input terminal A from the effects of conducting transistor Q2. At the same time, transistor Q1 is not conductive, there is an extremely high resistance between ground 4 and terminal B; therefore, any input signals that are applied at terminal A appear at terminal B.

When the conductive states of transistors Q1 and Q2 are reversed by an application of negative biasing potential at terminal T, a circuit may be traced from input terminal A through resistance R1 and conductive transistor Q1 to ground 4; hence, terminal B is at ground potential. The potential drop across resistance R1 tends to isolate input terminal A from the effects of conductive transistor Q1. At the same time, input signals applied at terminal A appear at terminal C because transistor Q2 is non-conductive and offers a high resistance to ground.

Thus, FIG. 1 shows means for switching input signals applied at terminal A to either of two output terminals, B or C, depending upon the presence or absence of a control potential at terminal T.

Means is provided by the circuitry shown in FIG. 2 for selectively connecting either input terminal A1 or input terminal A2 to an output terminal B. Diodes 20 and 21 are provided so that signals applied at input terminal A1 do not appear at input terminal A2 and vice versa; however, if it were not for transistors Q1 and Q2 input signals applied at both of the input terminals A1 and A2 would appear at output terminal B. As explained above, transistor Q2 is normally conductive and transistor Q1 is normally non-conductive responsive to positive polarity control potential applied at terminal 1. If input signals are applied to terminals A1 and A2 at this time, the signal at terminal A2 is shunted to ground 4 through the low resistance of conductive transistor Q2. An input signal applied at terminal A1 is conducted through diode 20 to output terminal B since non-conductive transistor Q1 presents a high resistance between terminal A1 and ground 4. When a control signal is applied to terminal T (FIG. 2), transistor Q1 becomes conductive thereby shunting any input signals applied at terminal A1 to ground. Transistor Q2 is non-conductive; therefore, there is a high resistance between terminal A2 and ground 4 so that input signals applied at terminal A2 are conducted through diode 21 to output terminal B.

While the principles of the invention have been described above in connection with specific apparatus, it is to be clearly understood that this description is made only by way of example and not as a limitation to the scope of the invention.

I claim:

1. An electronic single pole-double throw switch comprising an input terminal, a trigger terminal, and two output terminals, said input terminal being connected to both said output terminals via direct current resistance, a pair of transistors having opposite polarity control characteristics, each of said transistors having emitter, collector, and base electrodes, emitter-collector electrodes of the two transistors being connected in series between said pair of output terminals, a neutral potential connected to said series circuit between said transistors, means for normally applying a potential of first polarity to the base electrodes of both of said transistors whereby one of said transistors is turned "on" and the other of said transistors is turned "off," and means responsive to the receipt of a signal at said trigger terminal for applying a potential of opposite polarity to the base electrodes of both said transistors whereby said one transistor is turned "off" and the other of said transistors is turned "on."

2. An electronic single pole-double throw switch comprising a first terminal, a pair of second terminals, and a trigger terminal, said first terminal being connected to both of said second terminals via passive circuit elements, a pair of transistors having opposite polarity control characteristics, each of said transistors having emitter, collector, and base electrodes, a series circuit effectively connected between said pair of terminals, said series circuit including the emitter-collector electrodes of a first of said transistors, a neutral potential point, and the emitter-collector electrodes of the second of said transistors, means for normally applying a control potential of first polarity to said base electrodes whereby one of said transistors turns on effectively to short circuit one of said second terminals to said neutral potential point, and means responsive to the receipt of a signal at said trigger terminal for applying a potential of opposite polarity to the base electrodes of both said transistors whereby the other of said transistors turns on effectively to short circuit the other of said second terminals to said neutral potential point.

References Cited by the Examiner

UNITED STATES PATENTS

| | | | |
|---|---|---|---|
| 2,764,687 | 9/56 | Buchanan et al. | 307—88.5 |
| 2,843,743 | 7/58 | Hamilton | 307—88.5 |
| 2,864,961 | 12/58 | Lohman et al. | 307—88.5 |
| 2,880,332 | 3/59 | Wanlass | 307—88.5 |
| 2,918,627 | 12/59 | Denz | 307—88.5 |
| 2,989,652 | 6/61 | Hall | 307—88.5 |

OTHER REFERENCES

Hurley: Junction Transistor Electronics, Wiley & Sons, 1958 (2nd printing 1959) (page 349 relied on).

"Transistor Circuit Engineering" by Shea, pub. by John Wiley, N.Y., 1957, page 316.

Taub: Pulse and Digital Circuits, McGraw-Hill Book Co., Inc., 1956, pages 422 to 423.

ARTHUR GAUSS, *Primary Examiner.*

GEORGE N. WESTBY, JOHN W. HUCKERT, *Examiners.*